United States Patent [19]

Sell

[11] 4,006,304
[45] Feb. 1, 1977

[54] APPARATUS FOR WORD SYNCHRONIZATION IN AN OPTICAL COMMUNICATION SYSTEM

[75] Inventor: Darrell Dean Sell, Holmdel, N.J.

[73] Assignee: Bell Telephone Laboratories, Incorporated, Murray Hill, N.J.

[22] Filed: Dec. 10, 1975

[21] Appl. No.: 639,374

[52] U.S. Cl. .............................. 178/69.1; 250/199; 340/347 DD

[51] Int. Cl.² ............................................ H04L 7/00

[58] Field of Search ......................... 178/69.5 R, 88; 340/146.1 D, 146.1 AB, 347 DD; 328/72.55; 325/38 A

[56] References Cited

UNITED STATES PATENTS

| | | |
|---|---|---|
| 3,648,237 | 3/1972 | Frey, Jr. et al. ............ 340/146.1 D |
| 3,903,504 | 12/1975 | Rogers et al. ................. 178/69.5 R |
| 3,927,401 | 12/1975 | McIntosh ..................... 340/347 DD |

OTHER PUBLICATIONS

Conference Record, vol. II International Conference on Communication, San Francisco, June 16–18, 1975 "Line Coding Plans for Fiber Optic Communication Systems, Y. Takasaki et al., pp. 32-20 – 32-24.

Proc. of the IEEE July, 1975, Line Coding Plan for Fiber Optic Communication Systems, Y. Takasaki et al., pp. 1081–1082.

*Primary Examiner*—Benedict V. Safourek
*Attorney, Agent, or Firm*—Daniel D. Dubosky

[57] ABSTRACT

An optical communication system is disclosed in which a bipolar signal of the type transmitted in digital transmission systems is converted into a unipolar binary signal for transmission over an optical transmission medium. The three levels of the bipolar signal are converted into three pairs of bits in the binary signal. One pair of bits is not utilized in the conversion and is therefore labeled as a forbidden word. Synchronization is achieved at the receiving location for the purpose of decoding by detecting the presence of the forbidden word in the binary signal and in response to this detection an energizing pulse is produced. This energizing pulse drives a clock circuit which in turn drives a decoding apparatus utilized to translate the binary signal back into the bipolar signal. As a result of this type of word synchronization, individual errors introduced into the binary signal do not result in a framing error.

4 Claims, 3 Drawing Figures

APPARATUS FOR WORD SYNCHRONIZATION IN AN OPTICAL COMMUNICATION SYSTEM

BACKGROUND OF THE INVENTION

This invention relates to optical communication systems and more particularly to optical communication systems that transmit bipolar digital signals by translating each digital level in the bipolar signal into two bits of a binary signal.

Large numbers of messages are now transmitted over the telephone plant by means of T1 and T2 Carrier Systems. In these systems speech signals are converted into bipolar electrical signals which are essentially binary in nature but the adjacent logic "1s" are caused to alternate in polarity. This alteration in polarity was deemed necessary in order to insure that a sufficient number of transitions would be available in the signal in order to permit the repeaters to derive timing information and to provide dc balance to preclude baseline wander in the ac coupled receiver. In addition, violations in the alternating polarity, known to those in the art as "bipolar violations", are inserted in order to stress receivers by introducing known amounts of baseline wander. The medium used for connecting the terminal stations and repeaters is wire pair cable. A large number of wire pair cables utilized to transmit both 1 and T2 carrier signals have already been installed in the major cities. These cables are physically positioned within ducts beneath the surface of the streets of the cities. Many of the ducts have already been loaded with wire pair cables to their full capacity. Expansion of the telephone plant in these areas, if that expansion is to take place with similar T Carrier Systems will require the installation of additional ducts. It would be advantageous if the existing wire pair cables in these ducts could be replaced by optical fibers inasmuch as each fiber is smaller than a wire and, in addition, may allow larger bandwidths to be transmitted.

In the period of transition when wire pair cables are being replaced by optical fibers, many electrical bipolar signals of the type generated in the T1 Digital Transmission System will have to be converted into optical signals in order to permit them to be transmitted over optical fibers. Inasmuch as there is no straightforward equivalent of two polarities in the optical signal, some sort of conversion is necessary. It would also be advantageous if the resulting optical signal were simply of the binary type as opposed to a multilevel optical signal, in order to simplify the repeater units which will be necessary in the optical transmission system. Finally, it is desirable to maintain the polarity information present in the bipolar signal of the T Carrier System inasmuch as polarity transitions and bipolar violations will continue to provide information to T carrier type equipment operating at the receiving end of the optical transmission system.

One such encoding which will both develop a binary signal in an optical transmission system and preserve the bipolar information is disclosed in a copending application by Messrs. J. S. Cook and S. D. Personick entitled, "Optical Communication System with Bipolar Input Signal" filed Aug. 1, 1975, Serial No. 601,049. In accordance with the Cook-Personick invention, each pulse of the bipolar signal is converted into two binary digits which are then utilized to modulate an optical signal source. Each positive pulse of the bipolar signal is converted into two equal binary digits of a first logic state and each negative pulse of bipolar signal is converted into two equal binary digits of the opposite logic state. Each digital zero or zero voltage level in the bipolar signal is converted into two binary digits of opposite logic states. One feature of this type of conversion is that the two opposite binary digits that are not utilized to represent the digital zero are not generated as a pair in the conversion process. This particular pair of binary digits is in essence a forbidden word with respect to the conversion. In the decoder apparatus disclosed in the Cook-Personick application the binary signal after being detected at the receiving location is stored in a 3-cell shift register. The logic apparatus connected to this shift register is designed to detect the presence of the forbidden code in each of the two pairs of adjacent cells in the 3-cell shift register. The remainder of the decoding apparatus is connected to decode two of the three bits present in the 3-cell shift register. Upon detection of the forbidden word in the two cells being utilized for decoding, the decoding apparatus is switched to the other pair of cells in the 3-cell register. In this way no information is lost as a result of the detection of an out-of-frame condition. Unfortunately, the Cook-Personick approach to word synchronization or framing has the potential shortcoming that an error in the data can be interpreted as an out-of-frame condition thereby causing a reframing which in turn leads to detection on the wrong pair of bits and the introduction of additional errors. In short, this prior art technique of reframing has been determined to be much too sensitive to single transmission errors.

SUMMARY OF THE INVENTION

In accordance with the present invention, apparatus at the receiving location of an optical communication system wherein a bipolar signal has been converted to a binary signal detects the presence of the forbidden word in the received binary pulse stream and in response to this detection generates an energizing pulse. This energizing pulse is caused to trigger a clock circuit whose tank circuit derives its energy from the developed energizing pulse. A voltage waveform developed by the clock circuit is then utilized to drive decoder apparatus which in turn translates the binary signal into a bipolar signal. It is a feature of the present invention that the apparatus utilized to detect the presence of the forbidden word in the binary pulse stream consists of a single cell in a shift register and a logic gate having one input connected to receive the bit stored in the shift register and a second input connected to receive the bit presented to an input of the cell.

BRIEF DESCRIPTION OF THE DRAWING

The present invention will be more readily understood after reading the following detailed description with the accompanying drawing in which.

DETAILED DESCRIPTION

Figure 1:
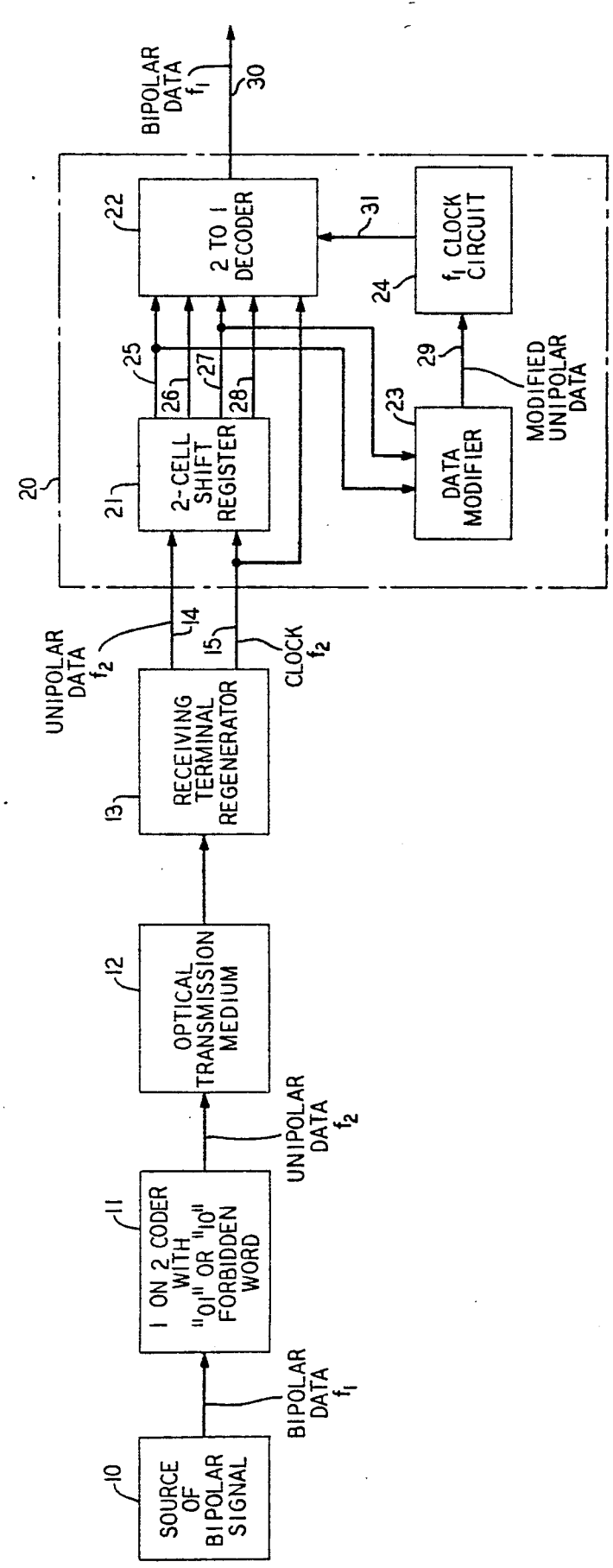
FIG. 1 is a schematic block diagram of an optical communication system including a decoder apparatus constructed in accordance with the present invention.

In FIG. 1 a source of bipolar signal 10 provides bipolar data of the type utilized in the T1 digital transmission system. In the T1 system the bipolar pulse repetition frequency, $f_1$, is equal to 1.544 megabits/sec. In this bipolar signal digital "1s" are represented by positive and negative voltage levels and the digital "0s" are represented by zero voltage. In normal operation, digital 1s are caused to alternate in polarity so that a constant dc value of zero is maintained in the bipolar signal. The bipolar signal provided by source 10 is coupled to the input of a coder 11 which develops two binary digits for each one of the three levels in the bipolar signal. A desirable encoding of the type disclosed in the above-identified Cook-Personick application is to translate each positive voltage level into two digital 1s, each negative voltage level into two digital 0s and finally each zero voltage level into two binary digits of opposite value. In accordance with the Cook-Personick invention the positive voltage level may also be transmitted as two digital 0s and the negative voltage level as two digital 1s. The only important characteristic is that both positive and negative voltage levels of the bipolar signal be transmitted as two identical binary digits. In this way the dc balance present in the original bipolar signal is maintained. The zero voltage level (the digital 0 in the bipolar signal) may be transmitted as either 01 or 10, and the binary pair that is not utilized is identified as the forbidden word.

Coder 11 also includes a source of optical signals which is modulated by the developed binary signal such that each digital 1 appears as an optical pulse of predetermined magnitude at the output of coder 11 and each digital 0 is translated into the absence of an optical pulse at the output of coder 11. As will be apparent to those skilled in the art, the digital 0 need not be represented by the total absence of an optical pulse. In fact, if a laser is used as the optical source (rather than a light emitting diode) the digital 0 is more likely to be represented by a pulse with approximately 10 percent of the power present in the pulse representing the digital 1. This binary unipolar data stream present at the output of coder 11 with a pulse repetition frequency of $f_2$ is coupled by way of an optical transmission medium 12 to a receiving terminal regenerator 13. In receiving terminal regenerator 13 the incoming optical binary signal is translated into an electrical binary signal on line 14. Receiving terminal regenerator 13 also provides a clock signal on line 15 having transitions with the same repetition frequency as the data bits present on line 14. The optical communication system described thus far is identical to apparatus disclosed in the above-identified Cook-Personick application which is utilized to convert a bipolar data stream of the type available from a T1 Digital Transmission System into a unipolar data stream at a receiving location.

The present invention is based on the discovery of a characteristic found in encodings of the type discussed hereinabove in connection with the Cook-Personick application. This characteristic is illustrated in the following table:

| Bipolar Level | Encoding Formats | | | |
|---|---|---|---|---|
| + | 11 | 11 | 00 | 00 |
| 0 | 01 | 10 | 01 | 10 |
| − | 00 | 00 | 11 | 11 |
| Forbidden Words = | 10 | 01 | 10 | 01 |

| Possible Sequences | Resulting Binary Digits | | | |
|---|---|---|---|---|
| +0 | 1[10]1 | 1110 | 0001 | 0[01]0 |
| +− | 1[10]0 | 1100 | 0011 | 0[01]1 |
| −+ | 0011 | 0[01]1 | 1[10]0 | 1100 |
| −0 | 0001 | 0[01]0 | 1[10]1 | 1110 |
| 0+ | 0111 | 1[01]1 | 0[10]0 | 1000 |
| 0− | 0[10]0 | 1000 | 0111 | 1[01]1 |
| 00 | 0[10]1 | 1[01]0 | 0[10]1 | 1[01]0 |

From the above table it can be seen that in the type of encodings under consideration, the forbidden word occurs as the last digit of a 2-digit word and the first digit of the next 2-digit word for four out of the seven possible sequences of two digits in the bipolar signal. In view of this characteristic it is feasible to utilize the forbidden word as a means of word synchronizing or framing the decoding which takes place at the receiving location.

The unipolar data present on line 14 is coupled to the input of a 2-cell shift register 21. Each bit present in the binary signal on line 14 is caused to be read into the first cell of the shift register in response to a positive going transition in the clock signal on line 15. The output of each cell in the shift register and the complementary outputs of both cells are coupled by way of lines 25 through 28 to the input of a 2-to-1 decoder 22. The term 2-to-1 is applied to this decoder inasmuch as two bits of the binary signal are converted into one level in the reconstructed bipolar signal. One output from each of the two cells in the shift register is also coupled by way of lines 25 and 27 to the input of a data modifier 23. This data modifier 23 utilizes the binary information present in both cells of the shift register to develop an energizing pulse on line 29 when cells of the shift register contain the forbidden word. The energizing pulses on line 29 are in essence a modified version of the unipolar data. Each energizing pulse on line 29 is caused to trigger a tank circuit present in the $f_1$ clock extraction circuit 24. A square voltage waveform is developed by clock circuit 24 and coupled to an input of decoder apparatus 22 in order to serve as a timing function for the translation of the binary data into bipolar form.

Figure 2:
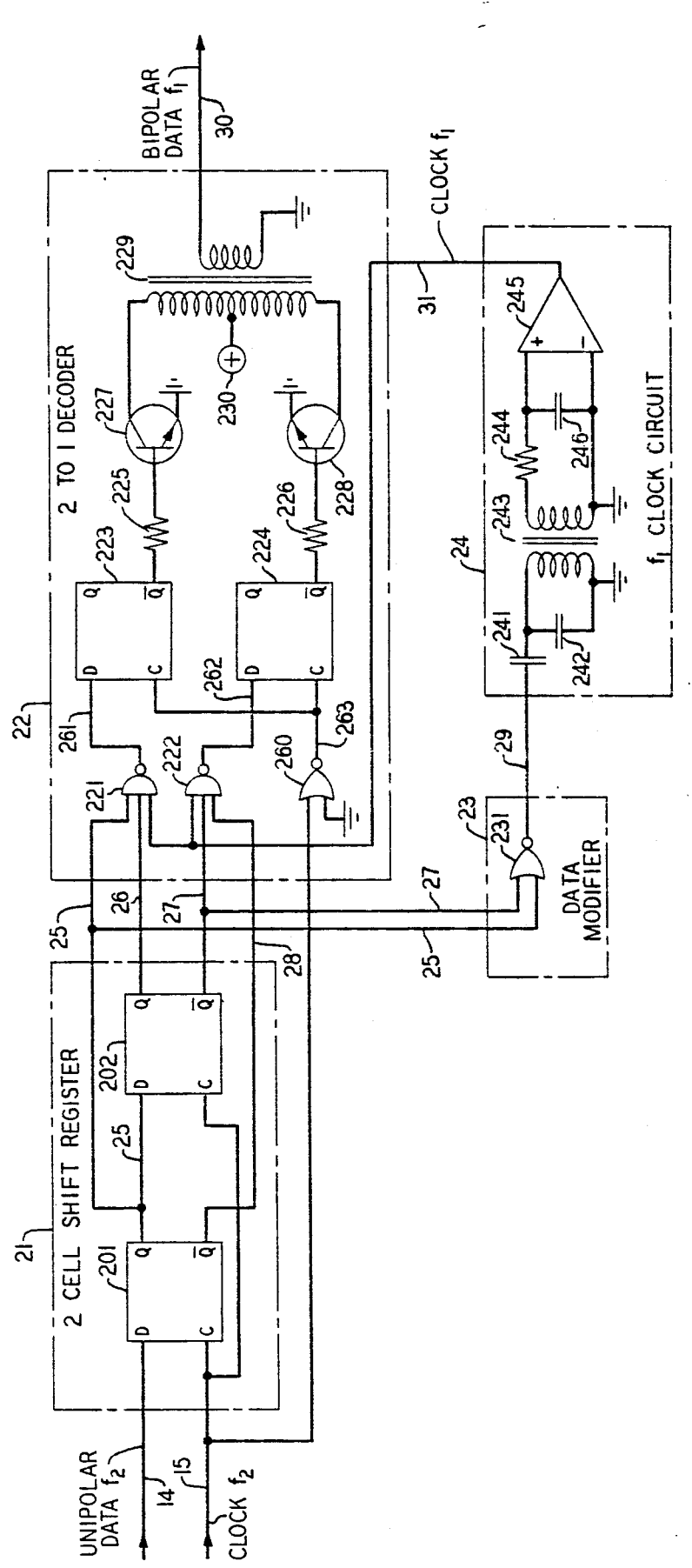
FIG. 2 is a detailed schematic block diagram of the framing circuit, clock circuit and decoder circuit shown as blocks in FIG. 1.
Figure 3:
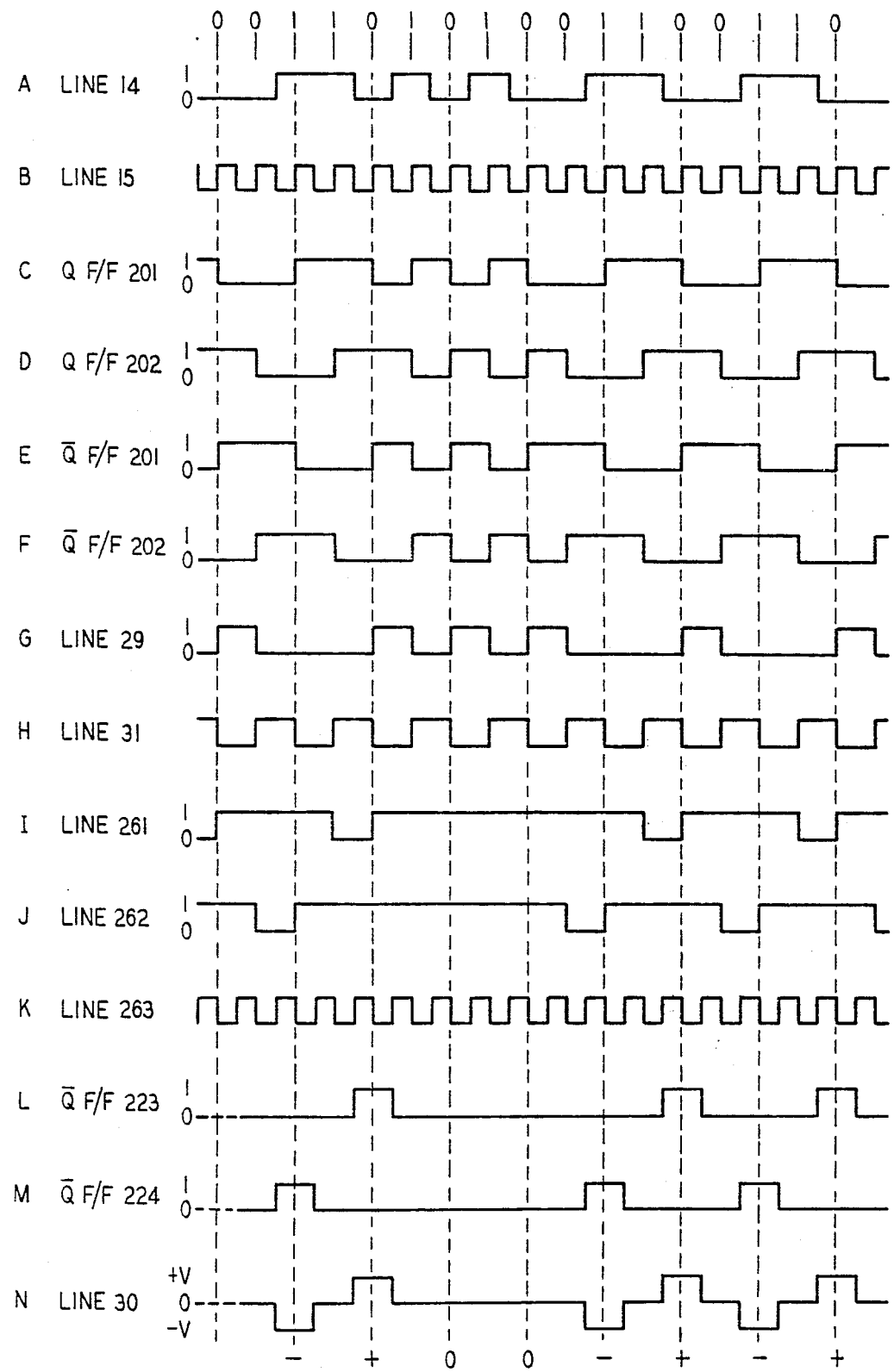
FIG. 3 is a family of voltage waveforms useful in describing the operation of the apparatus shown in FIG. 2.

A detailed schematic block diagram of shift register 21, decoder apparatus 22, clock circuit 24 and data modifier 23 is disclosed in FIG. 2 of the drawing. The particular embodiment of the apparatus disclosed in FIG. 2 is the one which will respond to a forbidden word of 10 in the binary pulse stream. In FIG. 2 unipolar binary data present on line 14 is coupled to the D input of a D-type flip-flop circuit 201. A typical sequence of binary digits which would be present on line 14 is shown as waveform A in FIG. 3. The clocking signal available on line 15 from the receiving terminal regenerator 13 is coupled in FIG. 2 to the clock input of flip-flop circuit 201. A typical clocking signal of the type present on line 15 is shown as waveform B in FIG. 3. Each positive-going transition in waveform B occurs approximately in the middle of the binary digit present on line 14. Upon the occurrence of each positive-going transition, flip-flop circuit 201 is caused to switch to a state dictated by the binary digit present on line 14. The resulting waveforms available at the Q output and $\overline{Q}$ output of flip-flop circuit 201 in response to the binary digits shown in waveform A are shown as waveforms C and E, respectively.

In FIG. 2 the Q output of flip-flop 201 is coupled by way of line 25 both to the input of decoder apparatus 22 and to the D input of a second flip-flop circuit 202. Flip-flop circuit 202 also responds to the clocking pulses present on line 15, and in response to each positive-going transition in the clocking signal, flip-flop circuit 202 switches its state to one which is dictated by the binary state available at the Q output of flip-flop 201. The voltage waveforms developed by flip-flop 202 at its Q and $\overline{Q}$ outputs are illustrated as waveforms D and F, respectively, in FIG. 3 for the typical binary digits shown as waveform A. As indicated in waveforms C through F of FIG. 3, flip-flop 202 provides the same outputs as flip-flop 201 but it does so at a later time interval. Specifically, the outputs from flip-flop 202 are delayed in time by one binary digit interval from the outputs of flip-flop 201.

The Q output of flip-flop 201 and the $\overline{Q}$ output of flip-flop 202 are coupled by way of lines 25 and 27 to a NOR gate 231. NOR gate 231 develops an energizing pulse at its output on line 29 whenever each of the inputs is presented with a digital 0. A digital 0 is present on both lines 25 and 27 when the forbidden word 10 is stored in shift registers 201 and 202. Hence, with a digital 1 stored in flip-flop 202 and a digital 0 stored in flip-flop 201 NOR gate 231 develops a digital 1 on line 29, thereby providing an energizing pulse to the clock circuit 24. For the waveforms developed in FIG. 3 corresponding to the digital bit stream illustrated as waveform A, the data modifier consisting of NOR gate 231 develops the pulse stream shown as waveform G in FIG. 3. As indicated in waveform G a digital 1 or energizing pulse is present on line 29 during each instance that a digital 1 is present in flip-flop 202 and a digital 0 is present in flip-flop 201.

As this point in the specification, it should be readily apparent to those skilled in the art that flip-flop 202 provides the only storage that is necessary to a development of the energizing pulses by NOR gate 231. In fact, the unipolar data on line 14 could be directly coupled to the D input of flip-flop 202 and the information on line 28 could be provided by an inhibit gate with an input connected to line 25 or line 25 could be directly connected to an inhibit input of NAND gate 222 (to be discussed hereinafter).

The energizing pulses on line 29 are coupled by way of a capacitor 241 to a tank circuit consisting of a capacitor 242 and the primary inductance of transformer 243 in the clock circuit 24. Each pulse on line 29 causes this tank circuit to ring and the Q of the tank circuit is large enough to sustain oscillations during the gaps that are present on line 29 when no pulses are present. The oscillations produced by this tank circuit are coupled from the secondary of transformer 243 through a resistor 244 to the positive input of a high gain differential amplifier 245. The negative input of differential amplifier 245 is connected to reference potential. A capacitor 246 connected between the positive input of differential amplifier 245 and reference potential causes an almost 90° phase shift to occur in the oscillations provided by the secondary of the transformer 233 to the input of the differential amplifier. This almost 90° phase shift is added to the 90° phase shift already present in the oscillations provided at the output of transformer 243 to result in a total phase shift of almost 180° for the entire clock circuit. Although some attenuation is introduced by the filter consisting of resistor 244 and capacitor 246, the gain of differential amplifier 245 is so high such that all sinusoidal voltage variations from the tank circuit cause the amplifier to saturate. In the embodiment constructed, a Texas Instruments SN 75107A was utilized as amplifier 245 and voltages in excess of 0.25 volt caused the amplifier to saturate. As a result, differential amplifier 245 provides a square wave voltage waveform on line 31 of the type shown as waveform H in FIG. 3. As indicated in waveform H the period of this clocking waveform on line 31 is equal to 2 times the interval for each bit present in the incoming binary bit stream.

As will be appreciated by those skilled in the art the type of clock generating circuit under consideration has considerable inertia and therefore a single error in the pulse stream provided by way of line 29 is unlikely to have a significant effect on the clocking signal generated by the clock circuit. Therefore even when an error in transmission causes an erroneous forbidden word to occur during the two bit interval used in the decoding, the clock circuit is essentially unaffected by this occurrence.

The clock pulses generated on line 31 by clock circuit 24 are coupled to one input of each of two NAND gates 221 and 222. NAND gate 221 has a second and third input coupled to the $\overline{Q}$ outputs of flip-flops 201 and 202, respectively. Similarly, NAND gate 222 has second and third outputs connected to the Q outputs of flip-flops 201 and 202, respectively. Each of the NAND gates 221 and 222 develops a digital 0 at its output only when all of its respective inputs are presented with a digital 1. NAND gate 221 operates to develop a digital 0 at its output only when digital 1s are present in each of flip-flops 201 and 202 and when the clock pulse is present from clocking circuit 24. Similarly, NAND gate 222 develops a digital 0 at its output when digital 0s are present in both flip-flops 201 and 202 and when the clock pulse is present from clocking circuit 24. As a result of the approximately 180° phase shift from pulses on line 29 to pulses on line 31, the between-the-word detection of the forbidden word results in an on-the-word framing of the information read by NAND gates 221 and 222. As will be appreciated by those skilled in the art, the coincidences of the pulses generated on line 31 by clock circuit 24 with the digital bits present in flip-flops 201 and 202 need not be perfect inasmuch as the outputs of NAND gates 221 and 222 are properly clocked in a manner to be described hereinafter by D-type flip-flops 223 and 224, respectively.

D-type flip-flop 223 operates in response to each positive-going transition in the inverted clock waveform available on line 263 at the output of NOR gate 260 to sample the digital state present at the output of NAND gate 221. Similarly, D-type flip-flop 224 responds to the positive-going transition in the clocking waveform on line 263 to sample the digital state present at the output of NAND gate 222. In this way the digital states at the outputs of NAND gates 221 and 222 are properly clocked and available at the outputs of D-type flip-flops 223 and 224, respectively. The type of waveform available on line 261 at the output of NAND gate 221 is illustrated as waveform I in FIG. 3 and the output of NAND gate 222 is illustrated as waveform J in FIG. 3. The resulting digital states available at the $\overline{Q}$ outputs of flip-flops 223 and 224 are illustrated as waveforms L and M, respectively, in FIG. 3. As indicated in waveform L in FIG. 3, the $\overline{Q}$ output of flip-flop 223 develops a digital 1 each time that the digital word 11 is stored in the input 2-cell shift register 21 during the clocking pulse from clock circuit 24. As indicated in waveform M of FIG. 3, the $\overline{Q}$ output of flip-flop 224 develops a digital 1 each time that the digital word 00 is stored in 2-cell shift register 21 during the clocking pulse from clock circuit 24.

The $\overline{Q}$ output of flip-flop 223 is coupled through a resistor 225 to the base electrode of a transistor 227. Similarly, the $\overline{Q}$ output of flip-flop 224 is coupled through a resistor 226 to the base electrode of a transistor 228. The emitter electrodes of both transistors 227 and 228 are coupled to a reference potential. Resistors 225 and 226 are present solely for the purpose of limiting the amount of current flow in the base-emitter junction of their respective transistors. The collectors of transistors 227 and 228 are connected to opposite ends of primary winding of a transformer 229, the center tap of this primary winding is connected to a positive potential source 230. Accordingly, the digital 1s present in the $\overline{Q}$ outputs of flip-flops 223 and 224 are amplified in their respective transistors 227 and 228 and transformer 229 provides at its secondary on line 30 a bipolar waveform of the type illustrated as waveform N in FIG. 3. Each digital 1 amplified by transistor 227 appears as a positive pulse on line 30, and each digital 1 amplified by transistor 228 appears as a negative pulse on line 30.

The implementation described hereinabove for the practice of the present invention is merely illustrative of one mode of practicing the invention. Numerous modifications may be made by those skilled in the art without departing from the spirit and scope of the present invention. For example, NAND gate 231 can be replaced by and AND gate having its inputs connected to lines 26 and 28. The other forbidden word, 01 can be detected by connecting a NAND gate to lines 26 and 28 or an AND gate to lines 25 and 27. In addition, the data modification process may be made completely independent of the decoding process by providing separate shift registers for the data input provided to the gate in the data modifier, or other type circuits may be utilized to detect the presence of the forbidden word in the binary pulse stream.

What is claimed is:

1. Apparatus for decoding a binary pulse stream wherein binary digits have been encoded as binary words to represent the three levels in a bipolar signal and one of the binary words represents a forbidden word, comprising decoder means having a control input for decoding each of said binary words into a bipolar voltage level in response to a clocking pulse at its control input, means for generating energizing pulses in response to the detection of said forbidden word in said binary pulse stream, and a clocking circuit responsive to said energizing pulses for developing clocking pulses at the control input of said decoder means.

2. Apparatus as defined in claim 1 wherein said decoder includes means for storing at least one of said binary digits from said binary pulse stream, and said means for generating energizing pulses includes a logic gate having one input responsive to at least one of said binary digits stored in said means for storing.

3. Apparatus for decoding a binary pulse stream wherein binary digits have been encoded as binary words to represent the three levels in a bipolar signal and one of said binary words represents a forbidden word, said apparatus comprising means responsive to said binary pulse stream for storing at least one of said binary digits, a decoder means connected to said binary pulse stream and to said means for storing for decoding at least two digits in response to a clocking pulse at its control input, gating means responsive to at least one digit in said binary pulse stream and to at least one digit stored in said means for storing for generating energizing pulses in response to the detection of said forbidden word, means responsive to each one of said energizing pulses for developing a clocking pulse at the control input of said decoding means.

4. Apparatus as defined in claim 3 wherein said means for storing at least one of said binary digits from said binary pulse stream includes a flip-flop circuit having an input to receive a binary digit to be stored, and said gating means for generating energizing pulses includes a logic circuit connected to be responsive to the binary digit stored in said flip-flop circuit and to the binary digit presented at said input of said flip-flop circuit.

* * * * *